Patented Oct. 21, 1947

2,429,575

UNITED STATES PATENT OFFICE 2,429,575

SYNTHESIS OF BRANCHED CHAIN HYDROCARBONS

Walter G. Appleby and Lawrence L. Lovell, Houston, Tex., and Mark P. L. Love, Alton, Ill., assignors to Shell Development Company, San Francisco, Calif., a corporation of Delaware No Drawing. Application September 16, 1944, Serial No. 554,522

21 Claims. (Cl. 260—683.6)

This invention relates to the production of branched chain saturated hydrocarbons and relates more particularly to the production of multi-branched open chain paraffinic hydrocarbons.

Branched chain paraffinic hydrocarbons, particularly multi-branched open chain paraffinic hydrocarbons, are finding ever increasing application not only as components in high quality motor fuels, but as starting and intermediate materials in the production of other compounds having special utilities. The presence of these materials in only exceedingly small amounts in the readily available naturally occurring materials such as crude petroleum and the hydrocarbon mixtures obtained by the thermal treatment of these naturally occurring materials has lead to consideration of practical ways of preparing them. This has lead to the disclosure of processes purporting to produce these compounds by means involving such steps as the treatment of naturally occurring hydrocarbons under isomerizing, alkylating, polymerizing conditions, etc. Such processes as disclosed heretofore, though providing highly efficient means for the production of single branched chain paraffins, do not provide for adequate production of the more desirable of the multi-branched open chain paraffin hydrocarbons such as branched octanes comprising, for example, dimethylhexanes and trimethylpentanes.

It is an object of the present invention to provide an improved process for the more efficient production of branched chain saturated hydrocarbons. A more particular object of the invention is the provision of a process for the more efficient production of highly desirable multi-branched open chain paraffinic hydrocarbons. Still another object of the invention is the provision of an improved process for the more efficient production of branched octanes comprising dimethylhexanes and trimethylpentanes. Other objects and advantages of the invention will become apparent from the following detailed description thereof.

In accordance with the process of the invention an unsaturated heterocyclic compound containing at least three carbon atoms in the ring in admixture with a suitable alkylating agent is contacted with an alkylation catalyst under alkylating conditions. The alkylate thus produced is subjected to catalytic hydrogenation under conditions resulting in hydrogenation with ring opening and formation of saturated open chain hydrocarbons of branched structure as the predominant reaction.

Suitable unsaturated heterocyclic compounds comprise the poly-unsaturated monoheteroatomic five-membered ring compounds such as, for example, thiophene. The unsaturated heterocyclic compound in admixture with a suitable alkylating agent, such as an olefinic hydrocarbon, for example, isobutylene, is contacted with an alkylation catalyst under alkylating conditions. The source of the heterocyclic compound and the alkylating agent is not material. Thus, they may be obtained by separation by any suitable means from naturally available materials such as crude petroleum from hydrocarbon mixtures obtained by the thermal or catalytic treatment of crude petroleum, coal tar, distillation products thereof, or other carbonaceous materials, or they may be the main, or by-product, of an organic synthesis or similar operation.

As catalysts for the process acids are used. Most preferably the chosen acid catalyst is employed with a suitable carrier so that it may conveniently be used in solid form as packing for tower or tube type reactors. Acids of phosphorus are particularly suitable for this purpose, especially mixtures of ortho or meta phosphoric acid or pyro phosphoric acid with kieselguhr or other suitable clays or earths such as are described in U. S. Patent 1,993,513. Although solid acid type catalysts comprising a calcined mixture of a phosphoric acid and a solid adsorbent are preferred, other catalysts such as sulfuric acid, hydrogen fluoride, or the like, adsorbed on porous supports or as a coating or film on non-porous packing material, or the like, may also be used in the process.

The alkylation is preferably carried out in the vapor phase. The ratio of heterocyclic compound to alkylating agent used may vary considerably within the scope of the invention depending upon the materials being charged, the specific catalyst employed and other operating conditions. Suitable conditions comprise the use of a molar ratio of heterocyclic compound to alkylating agent within the range of from about 0.5:1 to about 5.0:1, and preferably from about 1.0:1 to 3.0:1. The reaction is most advantageously executed under a superatmospheric pressure in the range of from about 150 to about 800 pounds and preferably from about 250 to about 500 pounds per square inch. The use of higher pressures may, however, be resorted to within the scope of the invention. The temperature and time of contact most favorable to the execution of the alkylation reaction will generally vary in accordance with the charge and the particular catalyst employed. Temperatures in the range of from about 175° C. to about 550° C. are employed. Temperatures in the range of from about 200° C. to about 400° C. and still more preferably from about 250° C. to about 300° C. and a hydrocarbon feed rate from about 0.1 to 0.9 gallon per hour per pound of catalyst are highly advantageous.

Fluids which are substantially inert under conditions of execution of the reaction and which are capable of functioning as diluents or heat carrying media may be added to the alkylation charge. Such fluids comprise, for example, normally gaseous and normally liquid paraffinic hydrocarbons. When employing alkylation catalysts of the solid phosphoric acid type, a small amount of water not substantially in excess of about 0.2% by weight of the hydrocarbon charge is introduced into the reaction zone. Under these conditions the heterocyclic compound is alkylated in the absence of any substantial formation of undesirable side reactions with high yields.

Without in any wise intending to limit the scope of the invention by theories advanced herein to set forth more fully the nature of the invention, it is believed that in the alkylation of thiophene with isobutylene under the above-identified conditions the resulting predominant reactions may be represented as proceeding as follows:

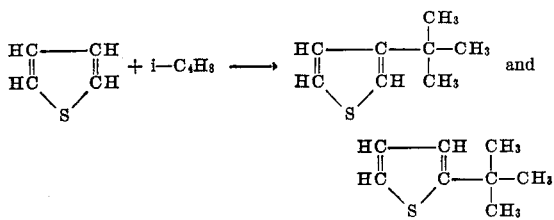

The alkylation product is subjected in part or in its entirety to catalytic hydrogenation under conditions resulting in the formation of open chain multi-branched paraffinic hydrocarbons. In a preferred method of carrying out the invention the products of the alkylation are subjected to a separation operation to effect the separation of an alkylate fraction consisting predominantly of alkylated heterocyclic compounds and a fraction comprising unreacted materials. The latter is recycled, at least in part, to the alkylation and the fraction comprising the alkylated heterocyclic compound is subjected to the catalytic hydrogenation conditions.

Suitable hydrogenation conditions comprise the use of a catalyst immune to poisoning by sulfur or sulfur-containing compounds, for example, a catalyst comprising a sulfide of a heavy metal, such in particular, as the sulfides of the metals of the left hand side of group VI of the periodic system. Molybdenum sulfide and/or tungsten sulfide are particularly suitable catalysts. The catalyst may further be advantageously promoted with a minor amount of a metal of the iron group. Cobalt and nickel are particularly effective promoters. Under the reaction conditions the promoter probably exists in the sulfided state. The metal sulfide or sulfides are preferably employed in combination with a relatively inactive material functioning as a diluent and/or carrier or support. The catalyst may be in any suitable form such as pills, spheres, extrudates, or irregular fragments of shape and size suitable for the particular reaction conditions used. The hydrogenation may be carried out in any suitable type of apparatus. One suitable method comprises passing the preheated alkylate in admixture with added hydrogen through a bed of the catalyst material at the specified conditions of temperature and pressure.

The hydrogenation reaction is carried out at a temperature within the range of from about 200° C. to about 500° C., preferably about 275° C. to about 450° C. and under a superatmospheric pressure in excess of, for example, about 300 pounds per square inch. Hydrogen is preferably added to the reactants in an amount sufficient to maintain a molar excess of hydrogen over alkylated heterocyclic compounds in the reaction zone. A ratio of hydrogen to alkylated heterocyclic compounds of 1.5:1 to 25:1, preferably 3:1 to 20:1 have been found advantageous. The particular operating conditions used in carrying out the catalytic hydrogenation with simultaneous ring opening will depend to some degree upon the particular catalyst used and the alkylated heterocyclic compounds charged. Thus, in the treatment of the tertiary isobutyl thiophene obtained by the alkylation of thiophene and isobutylene under the above-described conditions, hydrogenation conditions comprising a temperature in the range of from about 375° C. to 400° C. at a pressure of about 700 to 900 pounds per square inch, with a liquid hourly space velocity of about 4.5 to 6, and a ratio of hydrogen to alkylated heterocyclic compounds of 5:1 have been found particularly advantageous.

Under these conditions the alkylated heterocyclic compound is hydrogenated with simultaneous opening of the ring and removal of the hetero-atom, resulting in the production of a saturated branched chain hydrocarbon. Thus, in the hydrogenation of the tertiary butyl thiophene obtained in the alkylation step of the process, the reaction may be represented as proceeding as follows:

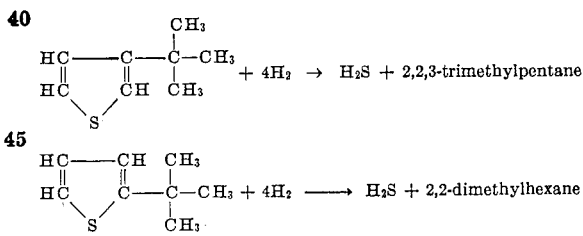

Hydrogen-rich gas is separated from the hydrogenation products and recycled to the hydrogenation zone. Since the presence of an amount of sulfur, for example, in the form of hydrogen sulfide, in the charge to the hydrogenation zone has the advantageous effect of increasing the active life of the catalyst, at least part of the hydrogen sulfide obtained in the reaction is recycled together with the hydrogen to the hydrogenation zone.

Although the detailed description of the invention has been directed to the utilization of isobutylene as the alkylating agent, the invention is by no means limited to the utilization of this particular olefin and any alkylating agent capable of replacing a hydrogen atom in the heterocyclic compound employed may suitably be used. The invention, as is apparent from the foregoing, is of particular value in the production of multi-branched open chain saturated hydrocarbons not available in naturally occurring materials, and though olefins other than branched olefins may suitably be employed as the alkylating agents, the utilization of alkylating agents comprising olefins of branched structure is particularly preferred since they result in the production of a product of multi-branched structure not readily obtainable by methods available heretofore. Suitable alkylating agents which may be employed in accordance with the process of the invention comprise the normal and branched chain olefins, such as for example, ethylene, propylene, normal and branched chain pentenes, hexenes, heptenes, etc. The alkylating agent may comprise mixtures of two or more such olefins, or hydrocarbon fractions comprising them, particularly hydrocarbon fractions obtained in the thermal treatment of hydrocarbons and comprising one or more olefinic hydrocarbons. Instead of the olefins, polymers may be used. Not only may ethers, alcohols, and esters corresponding to the foregoing olefins, be employed, but also other ethers, alcohols, and esters such as diethyl, methyl-ethyl, methyl-isopropyl, di-normal propyl, ethyl-isopropyl, and similar ethers, ethyl and higher primary alcohols, may be used. Either inorganic or organic esters such as halides, sulfates, phosphates, borates, formates, acetates, and the like, may be employed as alkylating agents. The alkylating agents may be used in the pure or substantially pure form or as mixtures of one or more alkylating agents with or without other materials which do not interfere with the desired reaction.

Particularly suitable poly-unsaturated mono-hetero-atomic five-membered ring compounds, other than thiophene, which are utilized as the unsaturated heterocyclic starting material comprise the heterocyclic compounds containing the thienyl, pyrryl or furyl radical such as the homologs of thiophene, for example, 2-methylthiophene, 3 - methylthiophene, 2,3 - dimethylthiophene, 2,4 - dimethylthiophene, 2,5 - dimethylthiophene, 3,4-dimethylthiophene, isopropylthiophene; furan, pyrrole, homologs thereof, such as for example, 2,5-dimethylfuran, 2-methylpyrrole, 3,5-methylpyrrole, 2,5-methylpyrrole, 4,5-methylpyrrole, 2-ethylpyrrole, 2-isopropylpyrrole, trimethylpyrrole, etc. The particularly suitable poly-unsaturated heterocyclic starting materials comprise broadly the heterocyclic compounds containing four carbon atoms and two conjugated double bond linkages in the ring.

It is furthermore to be stressed that the invention is not limited to the use of a specific catalyst in either the alkylating or hydrogenating zone. Though it is preferred to utilize an alkylation catalyst of the solid phosphoric acid type, other alkylation catalysts such as, for example, a catalyst containing a metal phosphate such as an acid phosphate of an alkaline earth metal, for example $Ca(H_2PO_4)$, as the active ingredient. The invention furthermore contemplates the utilization of liquid phase alkylation in the alkylation step utilizing such catalysts as sulfuric acid at temperatures of from about $-25°$ C. to about $100°$ C. and, where compatible with the hydrocarbon reactants used, such alkylation catalysts as the halides of aluminum at temperatures in the range of from about $25°$ C. to about $50°$ C. Similarly, though it is preferred to utilize catalysts comprising a sulfur of a heavy metal in the hydrogenation step, this is not considered to be a limiting feature, and other hydrogenation catalysts such as metals of groups VI, VII and VIII of the periodic system, such as tungsten, molybdenum, manganese, iron, nickel, cobalt, etc., and oxides, combinations thereof, composites thereof with alumina or inert silicious or refractory material, etc., may suitably be used.

The following examples are given as illustrative of the invention without, however, restricting it to the conditions employed therein.

Example I

Thiophene was alkylated with isobutylene by contact with a solid phosphoric acid type catalyst under the following conditions:

| | |
|---|---|
| Temperature °C | 260 |
| Pressure pounds per square inch | 300 |
| Hydrocarbon charge gallons per pound of catalyst per hour | 0.37 |
| Ratio by liquid volume of thiophene to isobutylene | 3.8 |
| Water added to feed per cent by weight | 0.1 |

The reactor effluence was fractionated to separate a fraction boiling in the range of from $149°$ C. to $176°$ C. comprising tertiary butylthiophene. The resulting tertiary butylthiophene-containing fraction was hydrogenated by contact with a hydrogenation catalyst consisting of tungsten and nickel sulfides under the following conditions:

| | |
|---|---|
| Temperature °C | 379 |
| Pressure pounds per square inch | 700 |
| Liquid hourly space velocity | 5 |
| Hydrogen to alkylated thiophene ratio | 5:1 |

A conversion of tertiary butylthiophene to octanes in excess of 55% was obtained. Infra-red analysis of the product indicated the presence of 2,2,3-trimethylpentane and 2,2-dimethylhexane.

Example II

Thiophene was alkylated with propylene by contact with a solid phosphoric acid type catalyst under the following conditions:

| | |
|---|---|
| Temperature °C | 285 |
| Pressure pounds per square inch | 300 |
| Mole ratio thiophene to propylene | 1/1 |
| Liquid hourly space velocity | 4.0 |
| Water added to feed per cent by weight | 0.1 |

Of the liquid reaction products 40% by volume was found to be isopropylthiophene. The liquid reaction products were distilled to separate a fraction predominating in 2-isopropylthiophene and a fraction predominating in 3-isopropylthiophene. Each of the isopropylthiophene fractions was separately hydrogenated by contact with a hydrogenation catalyst consisting of tungsten and nickel sulfides under the following conditions:

| | |
|---|---|
| Temperature °C | 285 |
| Pressure pounds per square inch | 500 |
| Liquid hourly space velocity | 0.3 |
| Mole ratio hydrogen to isopropylthiophene | 15 |

Analysis by infra-red absorption showed the product of the hydrogenation of the fraction predominating in 2-isopropylthiophene to consist essentially of 2-methylhexane and the product of the hydrogenation of the fraction predominating in 3-isopropylthiophene to consist essentially of 2,3-dimethylpentane.

It is to be stressed that the nature of the product or products obtained in accordance with the process of the invention is governed to a substantial degree not only by suitable adjustments of operating conditions but by modification of the process steps within the scope of the invention. By utilization of low molar ratios of the heterocyclic compound to alkylating agent, for example, about 1:1 and lower, substantial amounts of the dialkyl substitution product of the heterocyclic compound are obtained. Thus in the alkylation of thiophene with propylene with a molar ratio of thiophene to propylene of 1:1 under the above described alkylating conditions of temperature, pressure and catalyst the liquid reaction product contained about 25 percent by volume of alkylated thiophene, the analysis of which indicated it to consist essentially of diisopropylthiophene. Modification of the process steps within the scope of the invention comprises, for example, the utilization of a plurality of alkylating steps employing the same or different alkylating agents in the alkylation stages. Such procedures resulting in the formation and passage to the hydrogenation zone of a poly-alkyl substituted heterocyclic compound enables the production of a wide variety of highly branched saturated hydrocarbons. Thus, the alkylation of thiophene with propylene in a first alkylation zone and alkylation of the resulting reaction product with isobutene in a second reaction zone and hydrogenation of the reaction product from the second reaction zone under the above described conditions enables the production of such highly valuable branched chain paraffins as 2,2,7-trimethyloctane, 2,2,3,4,5-pentamethylhexane, and 2,2,5,6-tetramethylheptane.

Illustrative of further branched chain saturated hydrocarbons obtained in accordance with the invention are the branched chain paraffins of the following table obtained by treatment under the above-described conditions of thiophene and the olefins indicated in the table.

| Olefins Used in the Alkylation Step | Paraffin Produced on Hydrogenation of the Alkylated Thiophene |
| --- | --- |
| Butene-1 or 2 | 3-methylheptane<br>3,4-dimethylhexane |
| Pentene-1 | 4-methyloctane<br>3,4-dimethylheptane |
| 3-Methyl butene-1 | 2,3-dimethylheptane<br>2,3,4-trimethylhexane |
| Ethylene and isobutene | 2,2-dimethyloctane<br>2,2-dimethyl,3-ethylhexane<br>2,2,3,4-tetramethylhexane<br>2,2,5-trimethylheptane |
| Isobutene (two molecules) | 2,2,7,7-tetramethyloctane<br>2,2,5,5-tetramethyl,4-ethylhexane<br>2,2,5,6,6-pentamethylheptane<br>2,2,3,4,5,5-hexamethylhexane |

We claim as our invention:

1. A process of producing branched chain octanes comprising 2,2,3-trimethylpentane and 2,2-dimethylhexane which comprises reacting thiophene with isobutylene in the presence of a solid acid alkylating catalyst at a temperature of from about 250° C. to about 300° C., separating a fraction comprising tertiary butyl thiophene from the reaction products, and contacting said fraction in admixture with added hydrogen at a temperature in the range of from about 375° C. to about 400° C. with a catalyst comprising a sulfide of a heavy metal.

2. A process of producing multi-branched chain saturated hydrocarbons which comprises reacting thiophene with a branched chain olefin in the presence of a solid acid alkylating catalyst at a temperature of from about 200° C. to about 400° C., and contacting at least a part of the reaction products thus obtained in admixture with added hydrogen at a temperature in the range of from about 275° C. to about 450° C. with a catalyst comprising a sulfide of a heavy metal.

3. A process of producing saturated branched chain hydrocarbons which comprises reacting thiophene with an olefin in the presence of a solid acid alkylating catalyst at a temperature of from about 175° C. to about 550° C., and contacting at least a part of the reaction product thus obtained in admixture with added hydrogen at a temperature in the range of from about 200° C. to about 500° C. with a catalyst comprising a sulfide of a heavy metal.

4. A process of producing saturated branched chain hydrocarbons which comprises reacting furan with an olefin in the presence of a solid acid alkylating catalyst at a temperature of from about 175° C. to about 550° C., and contacting at least a part of the reaction products thus formed in admixture with added hydrogen at a temperature in the range of from about 200° C. to about 500° C. with a catalyst comprising a sulfide of a heavy metal.

5. A process for producing saturated branched chain hydrocarbons which comprises reacting pyrrole with an olefin in the presence of a solid acid alkylating catalyst at a temperature of from about 175° C. to about 550° C., and contacting at least a part of the reaction products thus formed in admixture with added hydrogen at a temperature in the range of from about 200° C. to about 500° C. with a catalyst comprising a sulfide of a heavy metal.

6. A process of producing saturated branched chain hydrocarbons which comprises reacting thiophene with an olefin at alkylating conditions in the presence of an alkylating catalyst, and contacting at least a part of the reaction products thus formed in admixture with added hydrogen at a temperature in the range of from about 200° C. to about 500° C. with a catalyst comprising a sulfide of a heavy metal.

7. A process of producing saturated branched chain hydrocarbons which comprises reacting thiophene with an olefin at alkylating conditions in the presence of an alkylating catalyst, and contacting at least a part of the reaction products thus formed in admixture with added hydrogen at hydrogenating conditions with a hydrogenating catalyst.

8. A process of producing saturated branched chain hydrocarbons which comprises reacting thiophene with an alkylating agent at alkylating conditions with an alkylating catalyst, and contacting at least a part of the reaction products thus formed at hydrogenating conditions with a hydrogenating catalyst.

9. A process of producing saturated branched chain hydrocarbons which comprises reacting a mononuclear poly-unsaturated monoheteroatomic five-membered ring compound with a branched chain olefin in the presence of a solid acid alkylating catalyst at a temperature in the range of from about 175° C. to about 550° C., and contacting at least a part of the reaction products thus formed in admixture with added hydrogen at a temperature in the range of from about 200° C. to about 500° C. with a catalyst comprising a sulfide of a heavy metal.

10. A process of producing saturated branched chain hydrocarbons which comprises reacting a mononuclear poly-unsaturated monoheteroatomic five-membered ring compound with an alkylating agent in the presence of a solid acid alkylating catalyst at a temperature in the range of from about 175° C. to about 550° C., and contacting at least a part of the reaction products thus formed in admixture with added hydrogen at a temperature in the range of from about 200° C. to about 500° C. with a catalyst comprising a sulfide of a heavy metal.

11. A process of producing saturated branched chain hydrocarbons which comprises reacting a mononuclear poly-unsaturated monoheteroatomic cyclic compound with an alkylating agent at alkylating conditions with an alkylating catalyst, and contacting at least a part of the reaction products thus formed in admixture with added hydrogen at a temperature in the range of from about 200° C. to about 500° C. with a catalyst comprising a sulfide of a heavy metal.

12. A process of producing saturated branched chain hydrocarbons which comprises reacting a mononuclear poly-unsaturated monoheteroatomic cyclic compound with an alkylating agent at alkylating conditions with an alkylating catalyst, and contacting at least a part of the reaction products thus formed in admixture with added hydrogen at hydrogenating conditions with a hydrogenating catalyst effecting the hydrogenation of alkylated poly-unsaturated monoheteroatomic cyclic compounds with simultaneous opening of the ring and removal of the hetero-atom resulting in the formation of saturated branched chain hydrocarbons.

13. A process of producing saturated branched chain hydrocarbons which comprises reacting a mononuclear unsaturated heterocyclic compound with an olefin in the presence of a solid acid alkylating catalyst at a temperature of from about 175° C. to about 550° C., and contacting at least a part of the reaction products thus formed in admixture with added hydrogen at a temperature of from about 200° C. to about 500° C. with a catalyst comprising a sulfide of a heavy metal.

14. A process of producing saturated branched chain hydrocarbons which comprises reacting a mononuclear unsaturated heterocyclic compound with an alkylating agent at alkylating conditions with an alkylating catalyst, and contacting at least a part of the reaction products thus formed in admixture with added hydrogen at hydrogenating conditions with a hydrogenating catalyst effecting the hydrogenation of alkylated unsaturated heterocyclic compounds with simultaneous opening of the ring and removal of the hetero-atom resulting in the formation of saturated branched chain hydrocarbons.

15. A process of producing branched chain octanes comprising 2,2,3-trimethylpentane and 2,2-dimethylhexane which comprises contacting tertiary butyl thiophene in admixture with hydrogen with a catalyst comprising a sulfide of a heavy metal at a temperature in the range of from about 375° C. to about 400° C.

16. A process of producing multi-branched chain saturated hydrocarbons which comprises contacting an isoalkylthiophene in admixture with added hydrogen with a catalyst comprising a sulfide of a heavy metal at a temperature in the range of from about 275° C. to about 450° C.

17. A process of producing multi-branched chain saturated hydrocarbons which comprises contacting a poly-isoalkyl substituted thiophene in admixture with added hydrogen with a catalyst comprising a sulfide of a heavy metal at a temperature in the range of from about 275° C. to about 450° C.

18. A process of producing branched chain saturated hydrocarbons which comprises contacting an isoalkyl substituted thiophene in admixture with added hydrogen with a catalyst comprising a sulfide of a heavy metal at a temperature in the range of from about 200° C. to about 500° C.

19. A process of producing multi-branched chain saturated hydrocarbons which comprises contacting an isoalkyl substituted mononuclear poly-unsaturated monoheteroatomic five-membered ring compound in admixture with added hydrogen with a catalyst comprising a sulfide of a heavy metal at a temperature in the range of from about 200° C. to about 500° C.

20. A process of producing multi-branched chain saturated hydrocarbons which comprises contacting a poly-isoalkyl substituted mononuclear poly-unsaturated monoheteroatomic five-members ring compound in admixture with added hydrogen with a catalyst comprising a sulfide of a heavy metal at a temperature in the range of from about 200° C. to about 500° C.

21. A process of producing saturated branched chain hydrocarbons which comprises contacting an isoalkyl substituted mononuclear unsaturated heterocyclic compound in admixture with added hydrogen with a hydrogenation catalyst at a temperature in the range of from about 200° C. to about 500° C.

WALTER G. APPLEBY.
LAWRENCE L. LOVELL.
MARK P. L. LOVE.

REFERENCES CITED

The following references are of record in the file of this patent:

UNITED STATES PATENTS

| Number | Name | Date |
|---|---|---|
| 951,072 | Heinemann | Mar. 1, 1910 |
| 1,897,798 | Guthke | Feb. 14, 1933 |
| 2,067,764 | Ipatieff et al. | Jan. 12, 1937 |
| 2,111,126 | Rabe | Mar. 15, 1938 |
| 2,141,611 | Malishev | Dec. 27, 1938 |
| 2,259,723 | Ballard et al. | Oct. 21, 1941 |
| 2,295,608 | Ruthruff | Sept. 15, 1942 |
| 2,344,469 | McAllister et al. | Mar. 14, 1944 |

OTHER REFERENCES

Byrns et al., Ind. Eng. Chem., vol. 35, No. 11, pages 1160–1167, Nov. 1943.